Dec. 17, 1935.    R. E. MILLER    2,024,656
ELECTROPNEUMATIC BRAKE
Filed Oct. 7, 1932    3 Sheets-Sheet 1
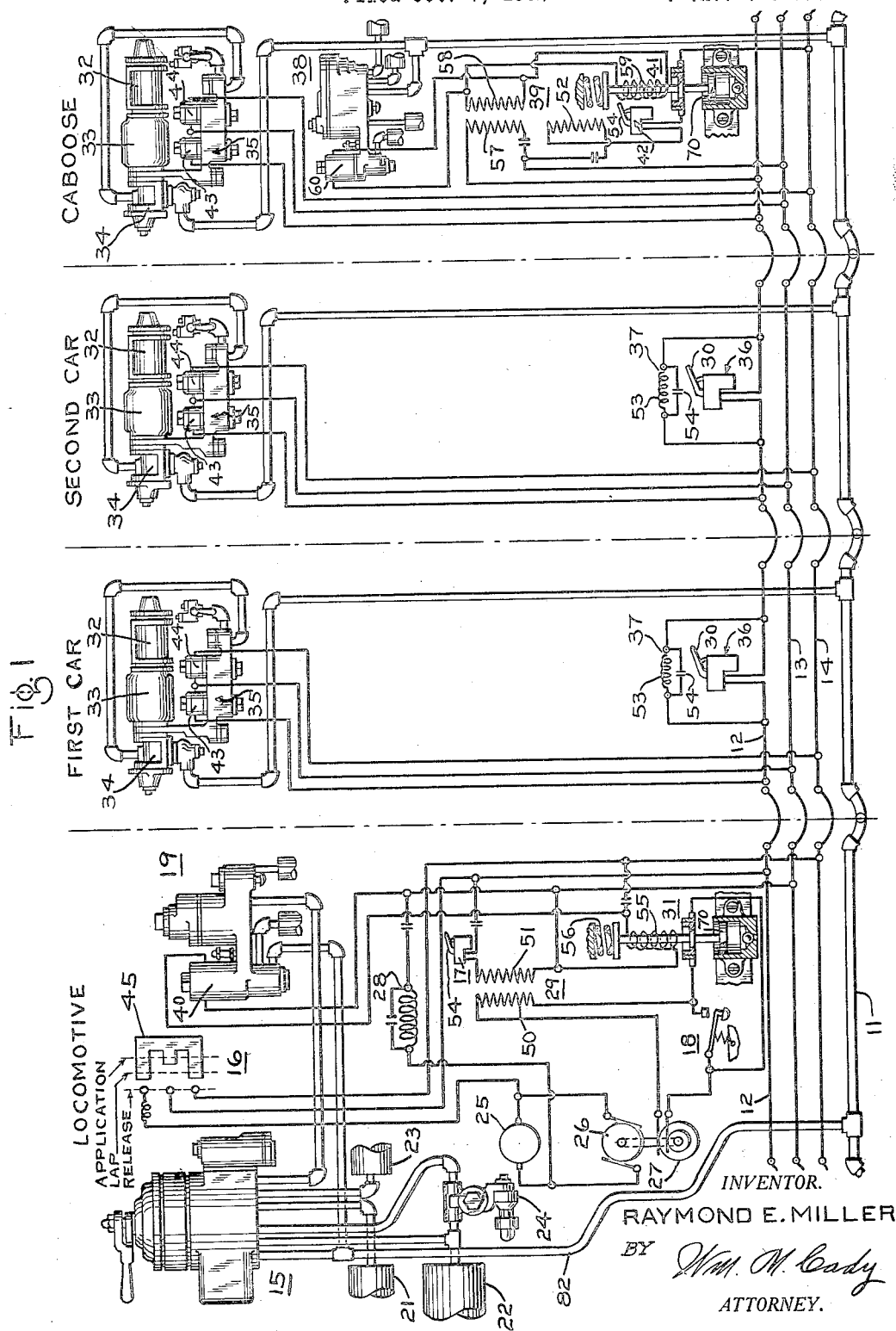
INVENTOR.
RAYMOND E. MILLER
BY *Wm. N. Cady*
ATTORNEY.

Dec. 17, 1935.  R. E. MILLER  2,024,656
ELECTROPNEUMATIC BRAKE
Filed Oct. 7, 1932  3 Sheets-Sheet 2
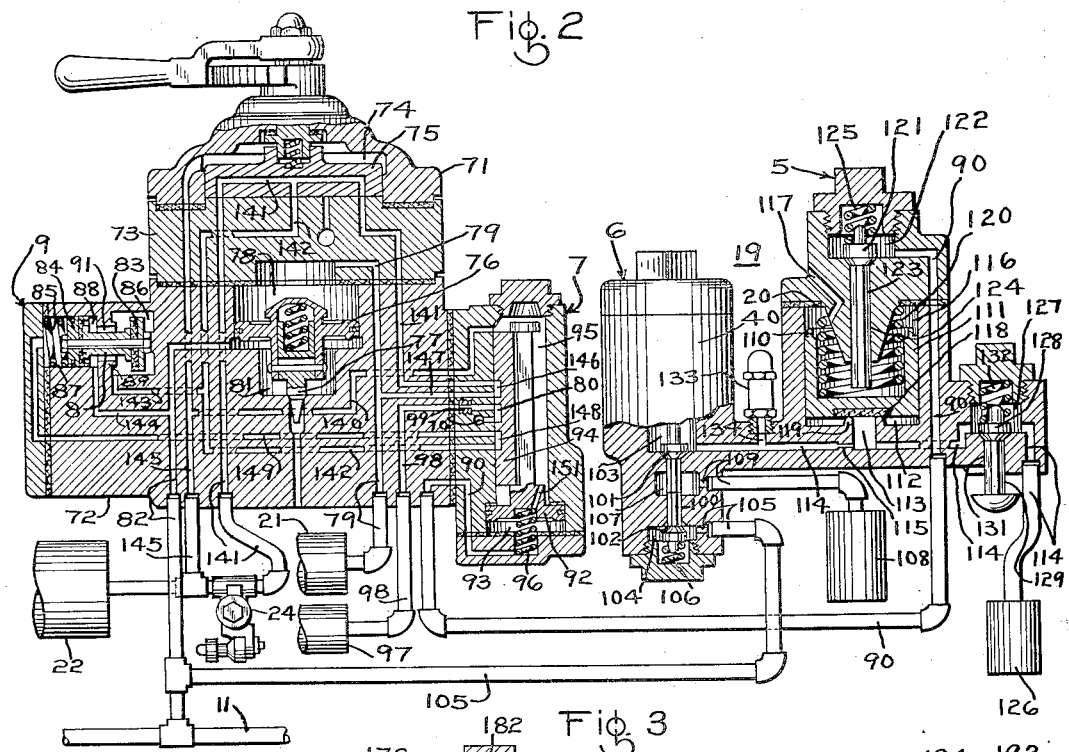
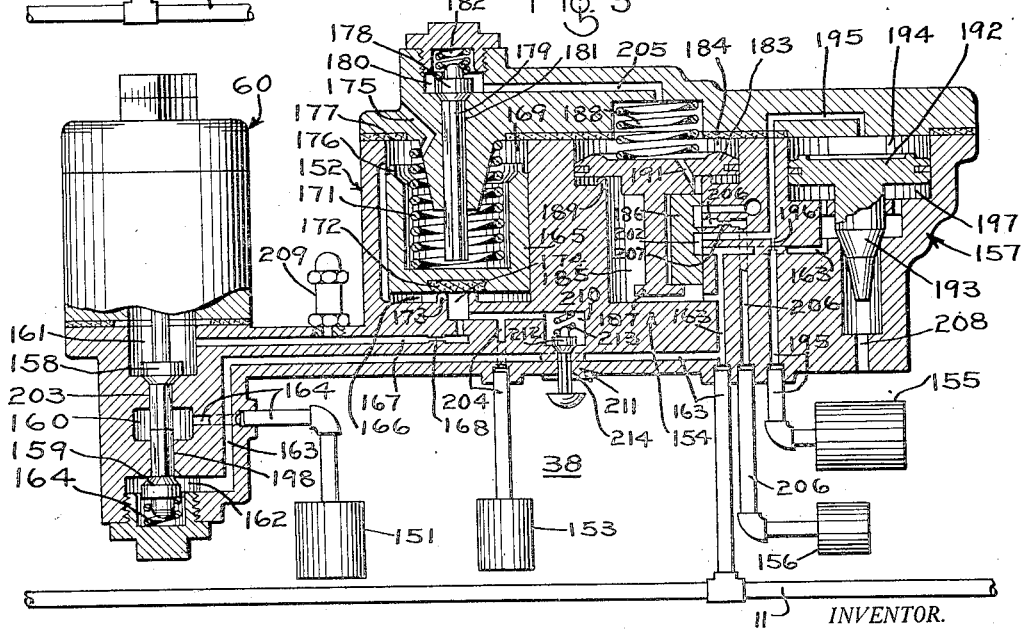
INVENTOR.
RAYMOND E. MILLER
BY Wm. M. Cady
ATTORNEY.

Dec. 17, 1935.        R. E. MILLER        2,024,656
ELECTROPNEUMATIC BRAKE
Filed Oct. 7, 1932        3 Sheets-Sheet 3

INVENTOR.
RAYMOND E. MILLER
BY *Wm. H. Cady*
ATTORNEY.

Patented Dec. 17, 1935

2,024,656

UNITED STATES PATENT OFFICE 2,024,656

ELECTROPNEUMATIC BRAKE

Raymond E. Miller, Wilkinsburg, Pa., assignor to The Westinghouse Air Brake Company, Wilmerding, Pa., a corporation of Pennsylvania Application October 7, 1932, Serial No. 636,647

34 Claims. (Cl. 303—20)

This invention relates to brake equipment and more particularly to electro-pneumatic brake equipment for train service.

In the copending application of Clyde C. Farmer, Serial No. 507,783, assigned to the assignee of this application, an electro-pneumatic brake system is disclosed, wherein the electrically operated brake controlling devices are connected in an open circuit so that no energy is consumed by the devices except when the circuit is closed and the devices are energized for effecting an operation of the brake equipment.

In order to apprise the trainmen of any break or failure in the electrical brake controlling system, a signal system is provided which utilizes the conductors of the electrical brake controlling system, but the circuit through the signal device is normally closed so that should one or more of the conductors of the brake controlling system become broken or short circuited, or the source of current supply fail, or the system otherwise become impaired so that insufficient current is available to initiate an application or release of the brakes, the consequent deenergization of the signal system which accompanies such failure, causes the sounding of an audible signal or the movement of a visual indicator.

The brake equipment disclosed in the above noted copending application is capable of initiating an application of the brakes, either by releasing fluid from the brake pipe at the locomotive and thereby reducing the brake pipe pressure for effecting serial operation of the brakes from the front to the rear of the train, or by substantially simultaneously energizing the control magnet on each car for effecting local venting of the brake pipe simultaneously at each car and thereby insuring simultaneous application of the brakes on each car.

This latter means of effecting an application of the brakes is more desirable than the former, because in the former case the brakes are applied first on the cars at the head end of the train, and in the case of a long train, the cars at the head end of the train may be materially retarded before the brakes are applied on the rear cars, and the slack may run in with considerable harshness, whereas in the latter case, the brakes are applied in unison on all cars of the train and there is but little tendency for slack to run in.

However, in the event of failure of the electrical control system, the train may be brought to rest under the influence of the pneumatic control system. Repairs may then be made to the electrical control system or the train may proceed to its destination under the control of the pneumatic control system.

It is an object of this invention to provide an electro-pneumatic train brake and train signal system, such as disclosed in the above copending application, with an improved signal device that is responsive to variations in current conditions in the electrical control system, which in addition to giving an audible or visual signal when a failure in the electrical brake control system occurs, will initiate an application of the brakes by simultaneously releasing fluid under pressure from the brake pipe at a point on the locomotive and on the caboose or rear car of the train, thereby causing the train to be brought to rest through an application of the brakes initiated simultaneously at the front and rear cars of the train, and thus preventing the gathering of slack with such force as would occasion severe shock.

A further object of the invention is to provide an electro-pneumatic brake control system having the above noted characteristics, wherein equipment may be provided for automatically causing, in the event of a failure such as referred to above, either a service application of the brakes or an emergency application thereof, depending upon the character of the equipment employed.

A further object of the invention is to provide an electro-pneumatic brake control system having a signal device adapted to be operated when a control circuit of the system is interrupted or deenergized either by failure of the conductors of the brake control system, for giving warning of the failure, or by an operator, for signalling a trainman on the locomotive or caboose, with a brake controlling device adapted to be operated when the circuit through the signal is interrupted continuously for a greater time than that required for operating the signal, as by an accidental break or short circuit in the conductors of the brake controlling system.

These and other objects of the invention that will be made apparent throughout the further description thereof, are attained by means of the brake equipment hereinafter described and illustrated in the accompanying drawings; wherein Fig. 1 is a diagrammatic view of an electro-pneumatic train brake equipment embodying features of the invention;

Fig. 2 is a sectional view, partially in elevation, of a combined signal and brake controlling valve device of the locomotive equipment shown in Fig. 1;

Fig. 3 is a sectional view, partially in section, of a combined signal and brake controlling valve device of the caboose equipment shown in Fig. 1.

Figure 4:
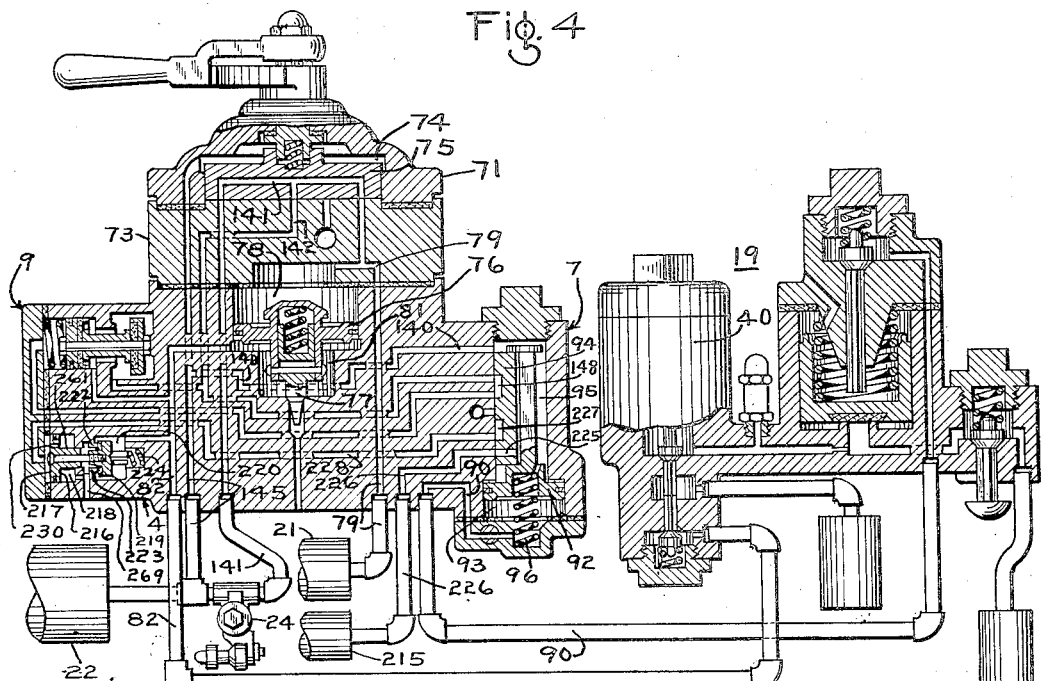
Figs. 4 and 5 are views similar to Figs. 2 and 3 respectively, of modified forms of combined signal and brake controlling valve devices of equipment for the locomotive and caboose respectively.

Referring to the drawings, and particularly to Fig. 1, an electro-pneumatic train brake equipment is shown that is similar in many respects to that disclosed in the above mentioned copending application, with the exception of the improved combined signal and brake controlling valve devices and a modified form of engineman's brake valve that is particularly adapted for use with the present improved signal and brake controlling equipment.

The improved equipment shown in Fig. 1 comprises a brake pipe 11, an application conductor 12, a return conductor 13 and a release conductor 14, all of which extend throughout the length of the train from the locomotive to the caboose. The equipment carried upon the locomotive comprises an engineman's brake valve device 15, an engineman's brake switch device 16, a signal switch device 17, a starting switch 18, a combined electro-magnetic signal and brake controlling valve device 19, an equalizing reservoir 21, a main reservoir 22, a reduction limiting reservoir 23, a feed valve device 24, a direct current generator 25, a direct current motor 26, an alternating current generator 27, a tuned impedance coil 28, a transformer 29, and a slow acting relay switch device 31 for controlling the circuit through the primary winding of the transformer 29.

The equipment carried on each car of the train comprises the equivalent of that disclosed in the said copending application, namely a brake cylinder 32, an auxiliary reservoir 33, a triple valve device 34, that is operative upon variations in brake pipe pressure for effecting application or release of the brakes, an electro-magnet valve device 35 that is operative upon energization or deenergization of the electro-magnets thereof for effecting application or release of the brakes, a signal switch device 36, and a tuned impedance device 37 shunting the signal switch 36 for permitting the flow of direct current through the application conductor 12 although the signal switch device may be open.

The equipment carried upon the caboose or last car of the train comprises a brake cylinder 32, an auxiliary reservoir 33, a triple valve device 34 and an electro-magnet valve device 35, all similar to those carried upon the cars of the train, a combined signal and brake controlling valve device 38, a transformer 39, a slow acting relay switch device 41 for controlling a circuit through one of two secondary windings of the transformer 39 and a signal switch 42.

The electro-magnet valve devices 35 are each provided with an application magnet valve device 43 that is connected across the application conductor 12 and the return conductor 13, and a release electro-magnet valve device 44 that is connected across the release conductor 14 and the return conductor 13.

When the application conductor 12 and the release conductor 14 are energized by moving the brake switch member 45 to application position for connecting said conductors to the generator 25, magnet valve devices 44 and 43 are energized and cause an application of the brakes by respectively closing communication from the brake cylinder 32 to the atmosphere and opening communication from the auxiliary reservoir 33 to the brake cylinder.

If it is desired to limit the degree of brake application, the switch 45 is moved to lap position when the desired brake cylinder pressure is attained, wherein the application conductor 12 is disconnected from the generator, thus deenergizing the electro-magnet valve devices 43 and closing communication from the auxiliary reservoir to the brake cylinder. Fluid cannot then flow to the brake cylinder and the brakes remain applied with the desired force.

In order to release the brakes, the brake switch 45 is turned to release position. With the brake switch device 45 in release position both conductors 12 and 14 are disconnected from the generator 25 and the electro-magnet valve devices 43 and 44 are deenergized, thus causing the communication from the brake cylinder to the atmosphere to be opened and the communication from the auxiliary reservoir to the brake cylinder to be closed, so that the brakes are released.

From the foregoing, it is apparent that the electro-magnet valve devices are connected in a normally open circuit supplied with current from a direct current generator, and since the circuit is normally open, a break or short circuit in any of the conductors 12, 13 and 14, would not ordinarily be made apparent until the brake switch member is moved to either application or lap position when attempting to make an application of the brakes. The discovery of the failure in the electrical brake controlling system at such time might be too late to avert an accident.

It is, therefore, desirable to apprise the trainmen of the occurrence of a failure of the circuit or source of supply at the time it occurs, so that the train may be brought to rest through the medium of the pneumatically operated brake controlling equipment in the usual well known manner.

In the brake equipment disclosed in said copending application, a warning signal system is provided for immediately indicating, through the medium of current responsive signal devices located upon the locomotive and caboose, when the current supply for the electrical brake controlling system fails or when a conductor of the system is broken or short circuited in such manner as to prevent proper operation of the electrical brake controlling equipment. Means are also provided by means of which a trainman on the locomotive, caboose, or any car of the train may cause the signal on the locomotive and caboose to operate at will for transmitting messages.

The improved signal system, like that disclosed in said copending application, utilizes the conductors 12, 13 and 14 upon which alternating current is imposed. The locomotive and all cars of the train and the caboose are provided with normally closed signal switches 17, 36 and 42 respectively. The signal switch 17 on the locomotive is connected across the application conductor 12 and the return conductor 13 and in series with the secondary winding 51 of the transformer 29 on the locomotive, and the signal switch 42 on the caboose is connected across the release conductor 14 and the return conductor 13 in series with a secondary winding 52 of the transformer 39 on the caboose.

The signal switches 36 on the cars are connected in series in the application conductor 12, and each switch 36 is shunted by a tuned impedance device 37 consisting of a coil 53 and a parallel connected condenser 54, the impedance devices being adapted to permit direct current to flow therethrough at all times, but preventing the passage of alternating current therethrough. Consequently, when a signal switch 36 is opened for the purpose of signalling, the alternating current signal circuit is interrupted. The construction of the signal switches 17, 36 and 42 is fully disclosed in said copending application and it need only be pointed out here that they are of such character that when the manual operating lever 30 thereof is operated, the circuit in which the signal switch is included is opened and held open for a predetermined limited time, for example, not exceeding two seconds, regardless of the position of the operating handle, so that the operator cannot, after initiating a signalling operation, interfere with the timed circuit closing operation of the signal switch. The purpose of this provision will hereinafter appear.

The normally closed signal circuits, to be hereinafter described, are adapted to be energized by alternating current supplied from the generator 27 through the medium of the transformer 29, the primary coil 50 of which is connected in circuit with the generator 27, and a slow acting relay switch 31 which is adapted to be maintained closed when the magnet winding 55 thereof is energized.

Until the signal circuit, including the magnet winding 55, is energized, the switch 31 is held in open position by a spring 56 and consequently the normally open starting switch device 18 is provided, by means of which the circuit through the primary winding 50 of the transformer 29 may be momentarily closed. Closure of the switch 18 closes the circuit through the primary winding 50 of the transformer 29 and causes energization of the secondary winding 51, which energizes the signal circuit through the application conductor 12, primary winding 57 of the transformer 39 and return conductor 13.

The primary winding 57 of the transformer 39 on the caboose energizes the secondary windings 58 and 52 of the transformer and consequently energizes winding 59 of the slow acting relay switch 41 that is connected in the circuit through the winding 58 and causes it to close the relay switch 41 so as to establish a second signal circuit energized by the secondary winding 52 of the transformer 39 and which includes the signal switch 42, closed relay switch 41, release conductor 14, winding 55 of the relay switch 31 on the locomotive and return conductor 13.

Since the electro-magnet 40 of the improved combined electro-magnet signal and brake controlling valve device 19 on the locomotive is connected across the conductors 13 and 14, included in the circuit through the secondary winding 52, it is energized so long as the switch 41 on the caboose remains closed. Energization of the secondary winding 58 also energizes a circuit through the electro-magnet 60 of the improved combined electro-magnet signal and brake controlling valve device 38 on the caboose, which will hereinafter be more fully described.

When the winding 55 is energized as above indicated, the relay switch 31 is closed and the circuit through the primary winding 50 is maintained through switch 31 so long as the second signal circuit, which may also be considered a holding circuit through the winding 55, is maintained closed. After the relay switch 31 is closed, the starting switch 18 may be released and permitted to return to its normally open position.

It will be here understood, that the relay switches 31 and 41 are provided with dash pot devices 70 and are of such character that they hold the circuits including them closed for more than two seconds after the circuits in their respective magnet windings 55 and 59 are open. Consequently, the opening of such circuits by means of the signal switches cannot cause opening of the relay switches 31 and 41, since, as previously described, the signal switches are incapable of holding the signal circuits open continuously for more than two seconds.

It is apparent from the foregoing that the electro-magnet 40 on the locomotive is energized through the secondary winding 52 of the transformer 39 on the caboose and the conductors 13 and 14. Therefore, any interruption of the circuit caused by a break in such circuit including conductors 13 and 14 and enduring for more than 2 seconds, will cause deenergization of the electro-magnet 40, which will result in the sounding of a signal on the locomotive, and in the case of the present invention an application of the brakes, as will hereinafter appear.

Momentary opening of the signal switch 42 on the caboose for the purpose of signalling, interrupts the circuit through the secondary winding 52 and the electro-magnet 40 on the locomotive and causes a signal on the locomotive to sound, but does not initiate an application of brakes, as will hereinafter appear.

The electro-magnet 60 of the combined electro-magnet signal and brake controlling valve device 38 on the caboose is connected in a circuit, including a secondary winding 58, and is energized thereby. The winding 58 is energized by the primary winding 57 of the transformer 39 on the caboose which is connected in a circuit including the conductors 12 and 13 and the secondary winding 51 of the transformer 29 on the locomotive, which winding 51 is energized by the primary winding 50. Any break in the circuit through the energizing winding 51 and conductors 12 and 13 enduring for more than two seconds, will cause the signal on the caboose to sound and an application of the brakes, in a manner to be hereinafter described.

Momentary opening of the signal switch 17 on the locomotive opens the circuit through the secondary winding 51 and consequently causes deenergization of the electro-magnet 60 on the caboose and the consequent sounding of the signal on the caboose, but does not cause an application of the brakes because the circuit cannot be held open continuously by the signal switch for more than two seconds.

The deenergization of the secondary winding 51, by the interruption of the circuit including it for more than two seconds or for sufficient time to permit opening of the circuit through the magnet winding 59 of the relay switch 41 on the caboose, will cause the switch 41 to open and interrupt the circuit through conductors 13 and 14 and the winding 55 of the switch 31 on the locomotive. The switch 31 will then interrupt the circuit through the primary winding 50 of the transformer 29, thereby concurrently deenergizing the circuit through electro-magnets 40 and 60 on the locomotive and caboose respectively, thus concurrently sounding a warning signal thereon and applying the brakes in a manner to be hereinafter described.

Momentary opening of any of the signal switches 36 on the cars of the train interrupts the conductor 12 and causes the simultaneous sounding of the signals on the locomotive and caboose by interrupting the circuit through the primary winding 57 of the transformer 39 on the caboose. This action deenergizes the secondary winding 58 of the transformer 39 on the caboose and deenergizes the magnet 60 on the caboose. Deenergization of the primary winding 57 of the transformer 39 on the caboose also deenergizes secondary winding 52 and consequently the circuit through conductors 13 and 14 energized thereby and including the electro-magnet winding 40 on the locomotive.

From the foregoing it is apparent that when the signal switch 17 on the locomotive is momentarily opened a signal is sounded on the caboose, when the signal switch 42 on the caboose is momentarily opened a signal is sounded on the locomotive, and when a signal switch 36 on a car of the train is momentarily opened a signal is sounded on both the caboose and locomotive.

It is also apparent that if the source of current fails or any of the electrical brake controlling conductors 12, 13 and 14 are broken so as to prevent energization of the electro-magnets 43 and 44 of the electro-magnet brake controlling valve devices 35 when energization is desired, for a time exceeding two seconds, signals will sound on both the locomotive and the caboose and that by reason of the improved combined electro-magnet signal and brake controlling valve devices, to be more fully hereinafter described, an application of the brakes of the train is initiated simultaneously at the front end and rear end of the train.

It will be noted that the primary winding 57 and the secondary winding 52 of the transformer 39 are connected in series across conductors 12 and 14 and in the event of the failure of the conductors 13, the windings are energized by the secondary winding 51 of the transformer 29 on the locomotive through the magnet winding 55, conductors 12 and 14 and switch 41. However, no current is induced in the secondary winding 58 of the transformer 39 on the caboose, due to the fact that the magnetic flux of the windings 57 and 52 is neutralized as a result of the winding being oppositely wound with an equal number of turns. Consequently, deenergization of the electro-magnet 60 occurs immediately and causes the signal on the caboose to sound. When the conductor 13 is broken, the circuit through the electro-magnet 40 is also interrupted, thus causing the warning signal on the locomotive to sound.

The improvements in the brake controlling equipment described above, reside principally in the combined electro-magnet signal and brake controlling valve device used in conjunction with an engineman's brake valve, particularly adapted for use with said brake controlling valve device.

Referring to Fig. 2, the engineman's brake valve device comprises an upper casing section 71, a lower casing section 72 and an intermediate casing section 73, and contained in a chamber 74 in the upper casing section 71 is a rotary valve 75.

Contained in the lower casing section 72 is the usual equalizing discharge valve mechanism, comprising an equalizing piston 76 and a brake pipe discharge valve 77 to be operated by said piston. The equalizing piston has a chamber 78 at its upper face, which chamber is connected with the equalizing reservoir 21 through a passage and pipe 79, and a chamber 81 at its lower face, which chamber is in constant communication with the brake pipe 11 through a passage and pipe 82.

Associated with the brake valve device is a cut-out valve mechanism 9, comprising a valve 83 and a piston 84 adapted to operate said valve, seating of said valve being opposed by the pressure of a spring 85 on said piston. The valve 83 is contained in a chamber 86. The piston has at one side a chamber 87 and at the opposite side a chamber 88, chambers 86 and 88 being separated by a partition wall 89 having an opening 91 through which a stem 8, connecting the valve 83 with the piston 84, is adapted to operate.

Also associated with the brake valve device is a brake application mechanism 7, comprising a piston 92 contained in a chamber 93 and a slide valve 94 contained in a valve chamber 95 and adapted to be operated by said piston, downward movement of said piston being opposed by the pressure of a spring 96 which normally retains the slide valve 94 in release position, as shown in Fig. 2. Associated with the brake application valve device is a reduction limiting reservoir 97, that is normally connected to the atmosphere through pipe and passage 98 having a restricted passage 99, cavity 80 in the slide valve 94 and atmospheric passage 70.

The combined electro-magnet signal and brake controlling valve device 19 for the locomotive includes a magnet valve device 6, comprising a magnet 40 adapted to control oppositely seating valves 101 and 102 contained in chambers 103 and 104 respectively, the chamber 104 communicating with the brake pipe 11 through a passage and pipe 105 and pipe 82. Also contained in the chamber 104 is a spring 106, the pressure of which tends to seat valve 102 and unseat valve 101. Intermediate the valves 101 and 102 there is a chamber 107 that is open to an operating reservoir 108 through a passage and pipe 109.

The brake controlling valve mechanism 19 also includes a timing valve device 5, comprising a piston 111 having at one side a chamber 112 which communicates with the chamber 103 of the magnet valve device through a passage 113 that is open to a passage 114 having a restricted passage 115 and which leads to the chamber 103. The piston 111 has at its upper face a chamber 116 and is normally held in its lower position, as shown in Fig. 2, by the pressure of a spring 120, in which position its valve seat 118 engages the seat rib 119 and closes the passage 113.

Communication from chamber 116 to the atmosphere is established through passage 117 and leakage of fluid under pressure to the atmosphere from the chamber 112 past the piston 111, when the latter is in its upper position, is prevented by engagement of the seat rib 110 on the piston 111 with the sealing seat 20.

A valve 121, contained within a chamber 122 and having a fluted stem 123 extending into the chamber 116 through a passage 124, is pressed into seated position by a spring 125 and is adapted to be unseated by the piston 111 when the latter is moved to its upper position. The chamber 122 is open to the chamber 93 of the brake application mechanism 7 through passage and pipe 90.

The chamber 103 is open to a timing reservoir 126 through the passage and pipe 114 and interposed in said passage is a chamber 127 containing a manually operable suppression valve 128 having a fluted stem 129 extending through a passage 131 leading to the atmosphere. The stem is provided with a manually operable button for moving the valve from its seat for venting fluid under pressure from the chamber 127, the timing reservoir 126 and passage 113 to the atmosphere. The valve is normally held seated by the pressure of a spring 132.

An audible signal device such as a fluid pressure excited whistle 133 is connected to the passage 114 through a passage 134.

In charging, fluid under pressure flows from the main reservoir 22 through the feed valve 24, pipe and passage 141, passages 142 and 143, chamber 86, of the cut-out valve mechanism 9, opening 91, chamber 88, passage 144, passage and pipe 82 to the brake pipe 11. Fluid also flows from the main reservoir through pipe and passage 145 to the chamber 74 containing the rotary brake valve stem 75, and from passage 145 through passage 146 to the valve chamber 95 of the brake application mechanism and from thence through passage 151 in the piston 92, chamber 93, and passage and pipe 90 to the chamber 122 of the timing valve device 5.

Fluid under pressure also flows from the feed valve 24 through pipe and passage 141, cavity 146 in the brake application slide valve 94, passage 147, and passage 79 to the equalizing discharge valve piston chamber 78, and to the equalizing reservoir 21. Fluid under pressure also flows from passage 141 through passage 142, cavity 148 in the brake application slide valve 94 and passage 149 to the chamber 87 of the cut-off valve device 9.

Fluid under pressure flows from the brake pipe 11 and pipe and passage 82 to chamber 81 of the equalizing discharge valve mechanism and through pipe and passage 105 to chamber 104 of the magnet valve device 6, and from thence past the open valve 102, through passage 106 to intermediate chamber 107 and thence through pipe and passage 109 to the operating reservoir 108.

Assuming the engineman's brake valve device to be in running position and the electro-magnet valve of the combined electro-magnet signal and brake controlling valve device 19 is energized and the parts of said valve device are in release position, and that the circuit through the winding of the magnet valve device has just been interrupted for more than two seconds, the consequent deenergization of the electro-magnet of the magnet valve device 40 permits the spring 100 to seat valve 102 and unseat valve 101. Unseating of valve 101 permits fluid under pressure to flow from the operating reservoir 108 past the unseated valve 101 to passage 114 and to the whistle 133 through passage 134, thus sounding an alarm.

Fluid under pressure also flows through passage 114 and restricted passage 115 to the timing reservoir 126, and when the pressure of the fluid acting on the inner seated area of valve seat 118 of the piston 111 builds up sufficiently to overcome the pressure of the spring 117, said piston is moved upwardly and engages the stem 124 of the valve 121, lifting it from its seat, thus opening communication from the chamber 93 of the brake application valve device to the atmosphere through passage and pipe 90, chamber 122, past the valve 121, passage 123, chamber 116, and atmospheric passage 117. The seat rib 119 on the upper face of the piston engages the sealing seat 20 and prevents the flow of fluid past the piston from the chamber 112.

Since the chamber 93 is open to atmosphere, the greater fluid pressure within the valve chamber 95 acting on the piston 92 forces it and the valve 94 to their application position, wherein cavity 80 in the slide valve 94 connects passage 149 with atmospheric passage 70, thus reducing the fluid pressure in the chamber 87 of the cut-off valve device 9. The higher fluid pressure in the chamber 88 acting on the inner face of the piston 84, forces it to its left position against the pressure of the spring 85, so that the valve 83 is seated and closes passage 91 and prevents the flow of fluid under pressure from the feed valve to the brake pipe 11.

With the slide valve 94 in lower or application position, communication is established from the equalizing piston chamber 78 to the reduction limiting reservoir 97 through passage 79, cavity 146 in the slide valve 94 and pipe and passage 98 containing the restricted passage 99, and fluid flows into said reservoir and reduces the fluid pressure within the chamber 78.

The higher brake pipe pressure within the chamber 81 acting on the equalizing piston 76, forces said piston upwardly, thus lifting the discharge valve 77 and opening the brake pipe to the atmosphere. Since a limited quantity of fluid under pressure flows from the equalizing reservoir 21 to the reduction limiting reservoir 97, the fluid pressure within the chamber 78 is reduced slightly, and when the brake pipe pressure falls slightly below that in chamber 78, the piston 76 is moved downwardly, thus seating the discharge valve 77 and preventing further reduction in brake pipe pressure. In this manner, a reduction in brake pipe pressure at a service rate is made and a service application of the brakes is initiated at the locomotive by reason of the prolonged interruption of a circuit through the magnet valve device 40.

However, should the circuit through the magnet valve device be interrupted momentarily by opening of a signal switch for a period of time less than two seconds, the magnet valve 102 will be seated and the valve 101 unseated for a corresponding length of time, thus momentarily sounding the whistle by permitting a blast of fluid under pressure to flow from the operating reservoir 108 to the passage 114, past the valve 101 in the manner previously described. Since it requires two seconds or more for the fluid under pressure supplied to the passage 114 to enter the timing reservoir and build up sufficient fluid pressure therein to lift the piston 111, said piston will not respond to the fluid under pressure within passage 114 and no brake application will be initiated.

Should it be desirable, upon a failure of a conductor of the electro-magnet brake equipment, or failure of the current supply, to suppress the automatic application of the brakes as above described, the engineman may upon hearing the warning signal, immediately press the suppression valve and open the valve 128, thereby preventing the pressure of the fluid in the passage 114 from building up sufficiently to lift the piston 111.

The engineman may hold the suppression valve 128 open until the pressure of the fluid in the operating reservoir 108 is below that necessary to lift the piston 111 and thus suppress an automatic application of the brakes until after the operating reservoir has been recharged as a result of reenergization of the magnet valve device 40.

In such an event, the engineman may operate the brake valve device so as to control the brakes pneumatically in the usual manner of pneumatic control, and bring the train to rest at any desired point in order to make repairs to the electrical control system.

Provision is made for also simultaneously initiating an automatic application of the brakes at the rear end of the train by causing a reduction in brake pipe pressure at a service rate by discharging fluid from the brake pipe at a valve device carried upon the caboose. For this purpose the combined electro-magnet signal and brake controlling valve device 38 is provided on the caboose, which device is illustrated in Fig. 3 and comprises the magnet valve device 60 similar to the magnet valve device 40 on the locomotive, an operating reservoir 151, a timing valve device 152, a timing reservoir 153, a brake application valve device 154, an equalizing reservoir 155, a reduction limiting reservoir 156, and a discharge valve device 157.

The magnet valve device 60 comprises an electro-magnet adapted to control opposite seating valves 158 and 159 and contained in chambers 161 and 162 respectively, the chamber 162 communicating with the brake pipe 11 through passage and pipe 163. Also contained in the chamber 162 is a spring 164, the pressure of which tends to seat valve 159 and unseat valve 158. Intermediate the valves 158 and 159 is a chamber 160 that is open to the operating reservoir 151 through a passage and pipe 164.

The timing valve device 152 contains a piston 165 having at one side a chamber 166 from which communication is established, when the piston is in raised position, to the chamber 161 through passage 174 and passage 167, having a restricted passage 168. The piston has at its upper face a chamber 169, and is normally held in its lower position by the pressure of a spring 171, in which position its valve seat 172 engages the seat rib 173 and closes the passage 174.

The chamber 169 is open to the atmosphere through passage 175 and leakage of fluid under pressure to the atmosphere from the chamber 166 past the piston 165, when the piston is in its upper position, is prevented by engagement of the seat rib 176 on the piston with the sealing seat 177.

A valve 178 contained within a chamber 180 and having a fluted stem 179 extending into the chamber 169 through a passage 181, is pressed in seated position by a spring 182 and is adapted to be unseated by the piston 165 when the latter is moved to its upper position.

The brake application valve device 154 comprises a piston 183 having on one side a piston chamber 184 and on the other side a valve chamber 185 containing a slide valve 186 adapted to be operated by a piston stem 187 carried by the piston 183.

The piston chamber 184 is open to the chamber 180 of the timing valve device 152 and contains a spring 188, which normally presses the piston in release position against a sealing seat rib 189. Communication is established from the piston chamber 184 to the valve chamber 185 by a passage 191 in the piston 183.

The equalizing discharge valve mechanism 157 comprises a piston 192 and a brake pipe discharge valve 193 adapted to be operated by said piston. The equalizing piston has a chamber 194 at its upper face, which chamber is open to the equalizing reservoir 155 through a passage and pipe 195 having a restricted passage 196, and a chamber 197 at its lower face, which chamber is in constant communication with the brake pipe 11 through a passage and pipe 163.

The combined electro-magnet signal and brake controlling valve device 38 is charged from the brake pipe 11 in the following manner. Fluid under pressure flows from the brake pipe 11 through passage and pipe 163, chamber 162 of the magnet valve device 60, past the open valve 159, the passage 198, chamber 160 and passage and pipe 164 to the operating reservoir 151. Fluid under pressure also flows from the passage 163 to the valve chamber 185 of the brake application valve device 154 and from thence through port 191 in the piston 183 to the piston chamber 184. The fluid pressure acting on the upper face of the piston and the pressure of the spring 188 tend to hold the piston in release position upon the sealing seat rib 189.

With the piston 183 and slide valve 186 in release position, as shown in Fig. 3, fluid under pressure also flows from passage 163 through cavity 202 in the slide valve, passage 195 to the equalizing piston chamber 194 and to the equalizing reservoir 155 through the restricted passage 196 in passage 195. Fluid under pressure further flows from passage 163 to the chamber 197 at the under face of the equalizing piston 192.

Upon deenergization of the electro-magnet device 60 for more than two seconds, as a result of an accidental break in the electrical break control system, or failure of the current supply, the valve 159 of the magnet valve device is seated and the valve 158 is unseated. Unseating of the valve 158 permits fluid under pressure to flow from the operating reservoir 151 through pipe and passage 164, chamber 160, passage 203, past the open valve 158, chamber 161, and passage 167 to the whistle 209 which is thus sounded. Fluid under pressure is also supplied through passage 167, restricted passage 168, passage 174 and passage and pipe 204 to the timing reservoir 153, until pressure of the fluid therein and in the passages 204 and 174 and acting on the inner seated area of the seat 172 of the piston 165 builds up sufficiently to lift said piston against the pressure of spring 171, so that it unseats the valve 178. When the valve 178 is unseated, fluid under pressure flows from the chamber 184 of the brake application valve device 154 to the atmosphere through passage 205, chamber 180 of the timing valve device 152, past the open valve 178, passage 181, chamber 169 and atmospheric passage 175.

The greater fluid pressure acting on the lower face of the piston 183 moves it to its upper or application position against the pressure of the spring 188, moving the slide valve 186 to application position.

With the slide valve 186 in application position, passage 163 leading from the brake pipe 11 to the equalizing piston chamber 194 is blanked and communication is established from the chamber 194 to the reduction limiting reservoir 156 through passage 195, cavity 202 in the slide valve 186, and passage and pipe 206 having a restricted passage 207.

The greater fluid pressure acting on the under side of the equalizing piston 192 forces the piston upwardly and opens the discharge valve 193, thus permitting fluid under pressure to flow from the brake pipe 11 to the atmosphere from the chamber 197 past the valve 193 and through atmospheric passage 208 at a service rate, thus initiating a service application of the brakes at the rear end of the train. When the brake pipe pressure falls slightly below that of the equalizing piston chamber 194, determined by the flow of fluid from the equalizing reservoir 155 to the reduction limiting reservoir 156, the piston is moved downwardly and closes the discharge valve 193.

From the foregoing it is apparent that when the circuit through the electro-magnet 60 on the caboose is interrupted for a sufficient time to permit the pressure of the fluid in the timing reservoir 153 and acting on the timing piston 165, to build up sufficiently to overcome the pressure of the spring 171, the piston 165 is raised and a service application of the brakes is initiated.

The associated parts of the mechanism are so proportioned that at least two seconds are required after deenergization of the electro-magnet valve device 60 in order to build up sufficient fluid pressure to raise the piston 165 for initiating an application of the brakes. Consequently, for the reasons given relative to the brake controlling valve device carried on the locomotive and shown in Fig. 2, an application of the brakes will not be initiated by the valve device carried on the caboose when the electromagnet 60 is deenergized for a period of time less than two seconds, as when interrupted by the signal switches 17, 36 and 42, which are incapable of retaining the circuit open for two seconds or more. In the event of a circuit interruption due to the opening of a signal switch or damage to a conductor of the electric brake controlling system, the whistle 209 that is open to the passage 167 will sound.

A suppression valve device 211 contained in a chamber 210 open to passage 204, comprises a valve 212 normally held closed by a spring 213, and having an operating stem extending through an atmospheric passage 214. The suppression valve 211 is adapted to be manually operated by a trainman on the caboose, for the purpose of suppressing initiation of a brake application should suppression be desired. The valve releases fluid from the passage 204 and prevents when unseated, a sufficient build-up of fluid pressure in the timing reservoir and passage 174 to lift the piston 165.

By reason of the provision of the brake controlling valve devices 19 and 38 on the locomotive and caboose respectively, the brakes may be automatically applied simultaneously at the front and rear of the train in the event of failure, for more than a predetermined time, of the electric control system or the initiation of the application of the brakes may be suppressed at either or both ends of the train should the trainman so desire.

Signalling from the ends or from intermediate points on the train may be accomplished without interfering with the protective characteristics of the electrical control system, and without danger of initiating an application of the brakes.

Figure 5:
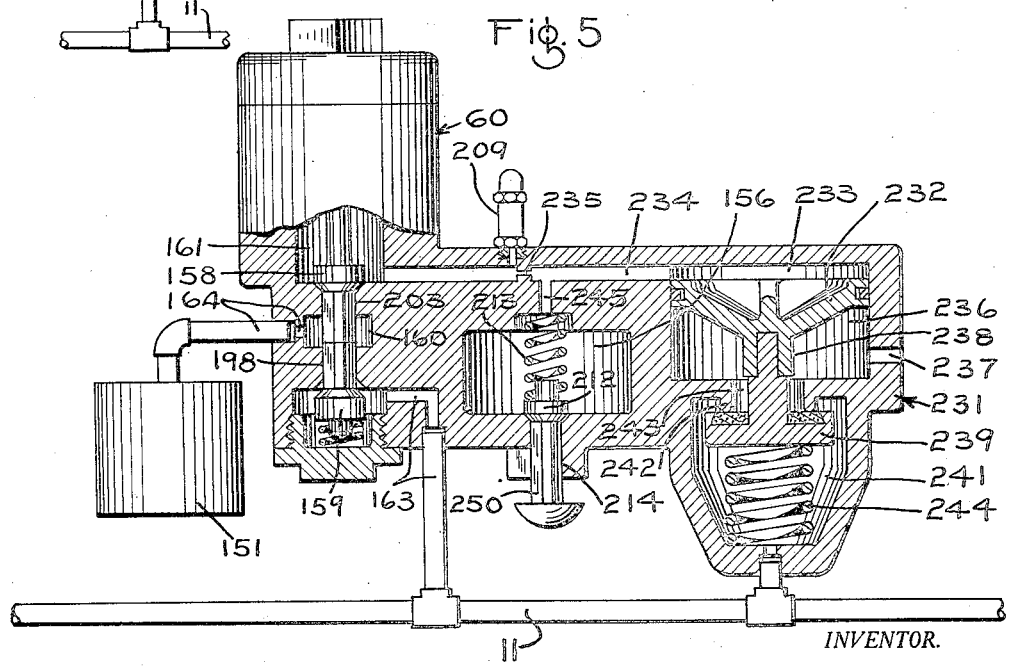

In Figs. 4 and 5, modified combined electromagnet signal and brake controlling valve devices are illustrated, wherein the devices are capable of automatically initiating, upon failure of the electrical control equipment, an emergency application of the brakes on the front and rear ends of a train.

The equipment shown in Fig. 4 is for use on the locomotive and is similar to that disclosed in Fig. 2, with the exception that the engineman's brake valve device is provided with a brake pipe vent valve device 4 that is controlled by the brake application valve device 7 for opening the brake pipe to atmosphere for reducing the brake pipe pressure at an emergency rate after the magnet valve device 40 is deenergized for a predetermined period of time.

Furthermore, the communication between the feed valve device 24 and the equalizing chamber 78 and equalizing reservoir 21 is not controlled by the slide valve 94 of the brake application valve device, as in the case of the equipment shown in Fig. 2, and a valve operating reservoir 215 for operating the brake pipe vent valve, is substituted for the reduction limiting reservoir 97 of the device shown in Fig. 2.

Referring to Fig. 4, the brake pipe vent valve device 4 comprises a piston 216 having at one face thereof a piston chamber 217 and at the other face a chamber 218 communicating with a chamber 220 through a passage 222 that is adapted to be closed by a valve 219 in valve chamber 220, and which is carried by a fluted stem 261 that extends through the passage 222 in the partition wall 223 between the chambers 218 and 220. The chamber 220 is open to the brake pipe 11 through passage and pipe 82 and the valve 219 is normally held seated by a spring 224.

The operation of the cut-out valve device 9 for controlling communication from the feed valve 24 to the brake pipe is controlled through a cavity 148 in the slide valve 94 in the manner of equipment shown in Fig. 2, the said cut-out valve serving to close said communication when an application of the brake is automatically initiated.

The equipment shown in Fig. 4 is charged in the manner of equipment shown in Fig. 2, with the exception that the operating reservoir 215 is charged from the main reservoir 22 through pipe and passage 145, passage 140, valve chamber 95, port 225 in the slide valve 94 and passage and pipe 226.

In the event of a failure of the current supply, or the control conductors on the electrical brake controlling equipment, for a predetermined time, the consequent deenergization of the magnet valve device 40 causes the fluid pressure in the piston chamber 93 to be reduced to atmospheric pressure in the manner of the equipment shown in Fig. 2. The higher main reservoir pressure within the valve chamber 95 acting on the upper side of the piston 92, forces the piston to its lower brake application position against the pressure of the spring 99, carrying the slide valve 94 to application position.

With the slide valve in application position, communication is closed from the feed valve device 24 to the brake pipe in the manner of the equipment shown in Fig. 2, and communication is established from the operating reservoir 215 to the piston chamber 217 of the brake pipe vent valve device 4 through pipe and passage 226, cavity 227 and passage 228. The chamber 218 is constantly open to the atmosphere through passage 222 and atmospheric passage 269 and the greater pressure in the chamber 217 moves the piston to the right and opens the valve 219 against the pressure of the spring 224 and the brake pipe pressure acting on the valve 219, thus opening communication from the brake pipe 11 through pipe and passage 82, chamber 220, past the open valve 219, passage 222 and atmospheric passage 269. The brake pipe pressure is thus reduced at an emergency rate and initiates an emergency application of the brakes at the front end of the train.

A restricted port 230 is provided in the piston 216 for relieving the pressure in the chamber 217, to permit the return of the piston 216 to release position shown when the slide valve 94 is returned to its upper release position.

The equipment just described, like that shown in Fig. 2, will not initiate an application of the brake when the circuit to the electro-magnet valve device 40 is deenergized for a period of time less than that required to operate the timing valve device, as when a signal switch 36 is opened for the purpose of signalling.

Referring to Fig. 5, a modified form of combined electro-magnet signal and brake controlling valve device is disclosed and is adapted for use on the caboose for sounding a warning signal or initiating an emergency application of the brakes at the rear end of the train simultaneously with the initiation of the emergency application of the brakes at the front end of the train.

The modified equipment comprises the magnet valve device 60 which is similar to that shown in Fig. 3, an operating reservoir 151, a timing reservoir 156 and a brake pipe vent valve device 231. The brake pipe vent valve device comprises a piston 232 having at the upper face a chamber 233 open to the chamber 161 of the magnet valve device 60 through a passage 234 and a restricted passage 235, and at the lower face a chamber 236 constantly open to the atmosphere through atmospheric passage 237.

The piston is provided with a stem 238 which carries a valve 239 contained within a valve chamber 241 that is open to the brake pipe 11. The valve is normally held in closed position upon a seat rib 242 surounding a passage 243 in the partition wall separating the chambers 236 and 241, by a spring 244.

A suppression valve device similar to that shown in Fig. 3 is associated with the timing reservoir 156 and comprises a valve 212, within the reservoir 156, having a fluted stem 250 extending through an atmospheric passage 214 and which may be manually operated for the same purpose as the suppression valve devices shown in Figs. 2 and 3. The valve 212 is normally held seated by a spring 213. The timing reservoir is open to the passage 234 through a passage 245.

With the parts of the brake control valve device in the release position shown in Fig. 5, the equipment is charged from the brake pipe 11, fluid under pressure flowing therefrom to the operating reservoir 151 through pipe and passage 163, chamber 162 of the magnet valve device 60, past the open valve 159, passage 198, intermediate chamber 160, and passage and pipe 164.

When the electro-magnet valve device 60 is deenergized, valve 159 is seated and valve 158 is unseated. With valve 158 unseated, fluid under pressure flows from the operating reservoir 151 through pipe and passage 164, chamber 160, passage 203, chamber 161, passage 234 to the timing valve reservoir 156, through passage 245, to the piston chamber 233 and to the warning whistle 209.

When the pressure of the fluid in the passage 234 and in the timing reservoir 156 and acting on the piston 232 in the piston chamber 233, builds up sufficiently to overcome the brake pipe pressure and the pressure of the spring 244 acting on the valve 239, the piston is moved downwardly so as to open the valve 239. With the valve 239 open, fluid under pressure is discharged from the brake pipe 11 to the atmosphere at an emergency rate through passage 243, chamber 236 and atmospheric passage 237, thereby initiating an emergency application of the brakes.

As with the previously described brake controlling valve devices, the time required for building up sufficient fluid pressure to operate the piston 232 is greater than the time during which the circuit through the magnet valve device 60 can be maintained open during a signalling operation, and consequently an emergency application of the brakes cannot be automatically initiated by the control valve device just described during a signalling operation.

It is apparent from the foregoing that the equipment provided on the locomotive and caboose of the train is adapted to simultaneously sound a warning at the locomotive and caboose when an interruption of the circuit for the electrical brake controlling system occurs and will automatically initiate an application of the brakes at a service or emergency rate, depending on which equipment is used, should the interruption of the circuit or the loss of current supply endure for more than a predetermined time, for example, two seconds. Means are provided for suppressing initiation of the brake application if desired and the safety system may be used for signalling purposes without causing initiation of a brake application.

While but two embodiments of the invention are disclosed, it is obvious that additions and omissions and other changes may be made in the construction and arrangement of the equipment without departing from the spirit of the invention.

Having now described my invention, what I claim as new and desire to secure by Letters Patent, is:

1. In an electric brake system, the combination with means operating on a normally open circuit for controlling the brakes, of means operating on a normally closed circuit and subject to the impedance characteristics of said normally open circuit for also controlling the brakes.

2. In an electrical brake system, the combination with means operating on a normally open circuit and adapted to initiate an application of the brakes when the said means is energized, of a second means including a signal device and a brake controlling device and operating on a normally closed second circuit including a portion of the first said circuit, adapted to initiate an application of the brakes and operate to give a signal when said second means is deenergized for a predetermined time and to operate only to give a signal when said second means is deenergized for a period of time less than said predetermined time.

3. In an electrical brake system, the combination with means operating on a normally open circuit and adapted to initiate an application of the brakes when the said means is energized, of a second means including a signal device and a brake controlling device and operating on a normally closed second circuit including a portion of the first said circuit, adapted to initiate an application of the brakes and operate to give a signal when said second means is deenergized for a predetermined time and to operate only to give a signal when said second means is deenergized for a period of time less than said predetermined time, and a manually operable means for interrupting said second circuit and adapted to automatically close said circuit within a period of time after interruption less than said predetermined time.

4. In an electrical brake system, the combination with means operating on a normally open circuit and adapted to initiate an application of the brakes when the said means is energized, of a second means including a signal device and a brake controlling device and operating on a normally closed second circuit including a portion of the first said circuit adapted to initiate an application of the brakes and operate to give a signal when said second means is deenergized for a predetermined time and to operate only to give a signal when said second means is deenergized for a period of time less than said predetermined time, a third means so connected in said second circuit that it is operative when the said included portion of said first circuit is interrupted to open said second circuit and hold it open indefinitely, a fourth means for preventing the interruption of the second circuit by said third means for a second predetermined time after the circuit through said third means has been interrupted, and a manually operable means for interrupting said circuit through said third means adapted to automatically close said circuit within a period of time after interruption less than the first and second said predetermined times.

5. In an electric brake system, the combination with means operating on a normally open circuit for controlling the brakes, of a normally closed circuit, a source of current in said normally closed circuit, means in said normally closed circuit operable automatically upon damage to either of said circuits for opening the circuit through said source of current, and means operable upon the opening of said normally closed circuit for initiating an application of the brakes.

6. In an electric brake system, the combination with means operating on a normally open circuit for controlling the brakes, of a normally closed circuit, a source of current in said normally closed circuit, switch means included in said normally closed circuit operable automatically upon damage to either of said circuits for opening the circuit through said source of current, means including a signal device and a brake controlling device operable upon opening of said normally closed circuit for warning of said damage and for initiating an application of the brakes, a signal switch device operable to open and close said normally closed circuit to control the operation of the warning means to operate said signal device, means operable to prevent said switch means from operating to circuit-opening position when said signal switch device is operated to open and close the normally closed circuit, and means operable to prevent said brake controlling device from initiating an application of the brakes when said signal switch device is operated to open and close the normally closed circuit.

7. In an electric brake system, the combination with means operating on a normally open circuit for controlling the brakes, of a normally closed circuit, a source of current in said normally closed circuit, switch means included in said normally closed circuit operable automatically upon damage to either of said circuits for opening the circuit through said source of current, a brake controlling means operable upon opening of said normally closed circuit through said switch means for initiating an application of the brakes, a signal operable upon opening of said normally closed circuit for warning of said damage, a signal switch device operable to open and close said normally closed circuit to control the operation of said signal for the purpose of signalling, and means operable to prevent said switch means from operating to circuit-opening position when said signal switch device is operated to open and close the normally closed circuit.

8. The combination with electrically controlled devices on the cars and caboose of a train adapted upon energization to effect an application of the brakes, and three main train conductors connected to said devices, of a source of direct current on the head end of the train normally cut out of circuit with said train conductors, a switch device operable to close the circuit through the train conductors, source of current and devices to effect the energization of said devices, a normally closed circuit including said main train conductors, a source of alternating current for said normally closed circuit, means included in said normally closed circuit and responsive to variations in current in said normally closed circuit for effecting an application of the brakes.

9. The combination with electrically controlled devices on the cars and caboose of a train adapted upon energization to effect an application of the brakes, and three main train conductors connected to said devices, of a source of direct current on the head end of the train normally cut out of circuit with said train conductors, a switch device operable to close the circuit through the train conductors, source of current and devices to effect the energization of said devices, a normally closed circuit including said main train conductors, a source of alternating current for said normally closed circuit, separate means at the head end and rear end of the train and responsive to variations in current in said normally closed circuit for initiating an application of the brakes at the head and rear ends of the train.

10. The combination with electrically controlled devices on the cars and caboose of a train adapted upon energization to effect an application of the brakes, and three main train conductors connected to said devices, of a source of direct current on the head end of the train normally cut out of circuit with said train conductors, a switch device operable to close the circuit through the train conductors, source of current and devices to effect the energization of said devices, a normally closed circuit including said main train conductors, a source of alternating current for said normally closed circuit, separate current responsive means at the head end and rear end of the train and included in said normally closed circuit adapted upon deenergization of said normally closed circuit to initiate an application of the brakes at the head and rear end of the train.

11. In an electric brake system, the combination with means operating on a normally open circuit for controlling the brakes, of a normally closed circuit system for indicating the condition of said normally open circuit and including a current transmission and two warning circuits inductively energized by current in said transmission circuit, and means responsive to variations in current in any of said circuits for effecting an application of the brakes.

12. In an electric brake system for a train of vehicles, the combination with an electric brake controlling circuit system including two electric circuits, each extending from vehicle to vehicle, means located in one vehicle to supply current to one of said circuits, means located in another vehicle to be energized by current flow in the first mentioned circuit and to thereby produce a current flow in the other circuit, and means located on one of said vehicles and responsive to variations in current in said other circuit for initiating an application of the brakes.

13. In an electric brake system for a train of vehicles, the combination with an electric brake controlling circuit system including two electric circuits, each extending from vehicle to vehicle, means located in one vehicle to supply current to one of said circuits, means located in another vehicle to be energized by current flow in the first mentioned circuit and to thereby produce a current flow in the other circuit, and means located on two of said vehicles and responsive to variations in current in said other circuit for initiating an application of the brakes at the head and rear end of the train.

14. In a fluid pressure brake system, the combination with a valve device operative upon variations of fluid pressure to effect operation of the brakes, of an electric current responsive device operative upon a variation in current for effecting a variation in fluid pressure acting on said valve device and means for delaying for a predetermined time the operation of said current responsive device to effect a variation in fluid pressure acting on said valve device after the current acting on said current responsive device has varied.

15. In a fluid pressure brake system, the combination with a valve device operative upon variations of fluid pressure to effect operation of the brakes, of an electric current responsive device operative upon a variation in current for effecting a variation in fluid pressure acting on said valve device, means for delaying for a predetermined time the operation of said current responsive device to effect a variation in fluid pressure after the current acting on said current responsive device has varied, manually operable means for effecting a variation of said current and means for automatically limiting the duration of said current variation to a period of time less than said predetermined time.

16. In a fluid pressure brake system, the combination with a brake valve device having a brake pipe discharge valve and a device operating on variations of fluid pressure for controlling said discharge valve, of a current responsive valve device operating upon a variation of current for a predetermined time for effecting variations in the fluid pressure acting on said device, and means for rendering said current responsive valve device ineffective for varying the fluid pressure acting on said device.

17. In a fluid pressure brake system, the combination with a valve device having a brake pipe discharge valve and a device operating on variations in fluid pressure for controlling said discharge valve, of an operating reservoir, a valve means for effecting variations in the pressure of the fluid acting on said device and operating on fluid from said reservoir, and a current responsive valve device for controlling the supply of fluid under pressure from said reservoir to said valve means.

18. In a fluid pressure brake system, the combination with a valve device having a brake pipe discharge valve and a device operating on variations in fluid pressure for controlling said discharge valve, of an operating reservoir, a valve means for effecting variations in the pressure of the fluid acting on said device and operating on fluid from said reservoir, a current responsive valve device for controlling the supply of fluid under pressure from said reservoir to said valve means, and a timing means cooperating with said valve means for controlling the rate of pressure build-up of the fluid under pressure supplied from said operating reservoir and acting on said valve means.

19. In a fluid pressure brake system, the combination with a valve device having a brake pipe discharge valve and a device operating on variations in fluid pressure for controlling said discharge valve, of an operating reservoir, a valve means for effecting variations in the pressure of the fluid acting on said device and operating on fluid from said reservoir, a current responsive valve device for controlling the supply of fluid under pressure from said reservoir to said valve means, a timing means cooperating with said valve means for determining the rate of pressure build-up of the fluid under pressure supplied from said operating reservoir and acting on said valve means, and means for rendering said timing means ineffective to determine the rate of pressure build-up of the fluid under pressure acting on said valve means.

20. In a fluid pressure brake system, the combination with a valve device having a brake pipe discharge valve and a device operating on variations in fluid pressure for controlling said discharge valve, of an operating reservoir, a valve means for effecting variations in the pressure of the fluid acting on said device and operating on fluid from said reservoir, a current responsive valve device for controlling the supply of fluid under pressure from said reservoir to said valve means, and a timing reservoir communicating with said valve means for controlling the rate of pressure build-up of the fluid under pressure supplied from said operating reservoir and acting on said valve means.

21. In a fluid pressure brake system, the combination with a valve device having a brake pipe discharge valve and a device operating on variations in fluid pressure for controlling said discharge valve, of an operating reservoir, a valve means for effecting variations in the pressure of the fluid acting on said device and operating on fluid from said reservoir, a fluid actuated signal device and a current responsive valve device for controlling the supply of fluid under pressure from said reservoir to said valve means and to said signal device.

22. In a fluid pressure brake system, the combination with a valve device having a brake pipe discharge valve and a device operating on variations in fluid pressure acting thereon for controlling said discharge valve, of an operating reservoir, a valve means operating on fluid supplied from said reservoir for effecting a variation in the pressure of the fluid acting on said device when the pressure on said valve means exceeds a predetermined value, a current responsive valve device for controlling the supply of fluid under pressure supplied from said operating reservoir and acting on said valve means, and means for controlling the rate of pressure build-up of the fluid supplied from said reservoir and acting on said valve means.

23. In a fluid pressure brake system, the combination with a valve device having a brake pipe discharge valve and a device operating on an increase in fluid pressure acting thereon for effecting opening movement of said discharge valve, of an operating reservoir, a valve means operating on fluid under pressure supplied from said reservoir for effecting an increase of fluid under pressure acting on said device when the pressure on said valve means exceeds a predetermined value, a current responsive valve device for controlling the supply of fluid under pressure supplied from said operating reservoir and acting on said valve means, and a timing reservoir for receiving fluid under pressure from said operating reservoir for determining the rate of pressure build-up of the fluid under pressure acting on said valve means.

24. In a fluid pressure brake system, the combination with a valve device having a brake pipe discharge valve and a device operating on an increase in fluid pressure acting thereon for effecting opening movement of said discharge valve, of an operating reservoir, a valve means operating on fluid under pressure supplied from said reservoir for effecting an increase of fluid under pressure acting on said device when the pressure on said valve means exceeds a predetermined value, a current responsive valve device for controlling the supply of fluid under pressure supplied from said operating reservoir and acting on said valve means, a timing reservoir for receiving fluid under pressure from said operating reservoir for determining the rate of pressure build-up of the fluid under pressure acting on said valve means, and a manually operable valve device for preventing the pressure of the fluid supplied from said operating reservoir and acting on said valve means from exceeding said predetermined value.

25. In a fluid pressure brake system, the combination of a brake valve device comprising manually operable means and a brake pipe discharge valve controlled by said manually operable means and operative upon variations in fluid pressure for venting fluid from the brake pipe, a device operating on variations of fluid pressure for also controlling the operation of said discharge valve, and a current responsive valve device for effecting variations in the fluid pressure acting on said device.

26. In a fluid pressure brake system, the combination of a brake valve device comprising manually operable means and a brake pipe discharge valve controlled by said manually operable means and operative upon variations in fluid pressure for venting fluid from the brake pipe, a device operating on variations of fluid pressure for also controlling the operation of said discharge valve, a current responsive valve device operative upon a variation of current to effect variations in the fluid pressure acting on said device, and timing means operative to prevent said current responsive means from being operative to effect variations in the fluid pressure acting on said device unless said current variation endures longer than a predetermined time.

27. In an electric brake system, the combination of means operating on a normally open circuit for controlling the operation of the brakes, and means operating on a normally energized circuit maintained closed through a portion of said normally open circuit, said second means being effective to cause an application of the brakes only after the said normally energized circuit has been deenergized longer than a predetermined time.

28. In an electric brake system, the combination of means operating on a normally open circuit for controlling the operation of the brakes, means operating on a normally energized circuit maintained closed through a portion of said normally open circuit, said second means being effective upon the deenergization of said normally energized circuit to cause an application of the brakes, and timing means for preventing said second means from being effective to cause an application of the brakes unless deenergization of said normally energized circuit continues for a period longer than a predetermined time.

29. In an electric brake system, the combination of means operating on a normally open circuit for controlling the operation of the brakes, and means operating on a circuit normally maintained closed through a portion of said normally open circuit for causing an audible indication and an application of the brakes to be effected upon the integrity of said circuits being destroyed.

30. In an electric brake system, the combination of means operating on a normally open circuit for controlling the operation of the brakes, means operating on a circuit normally maintained closed through a portion of said normally open circuit for effecting an application of the brakes upon the integrity of said circuits being destroyed, and signal means controlled by said second means and effective to give indication as to the lack of integrity of said circuits.

31. In an electric brake system, the combination of means operating on a normally open circuit for controlling the operation of the brakes, means operating on a circuit normally maintained closed through a portion of said normally open circuit for effecting an application of the brakes upon the integrity of said circuits being destroyed, signal means controlled by said second means and effective to give indication as to the integrity of said circuits, and manually operable means included in said normally closed circuit and operative to cause said signal means to give an audible signal without causing an application of the brakes.

32. In an electric brake system, in combination, a normally open circuit, means operating on said normally open circuit for controlling the brakes, a second circuit inductively coupled to said normally open circuit and adapted to be normally maintained closed through a portion of said normally open circuit, and means operating on said second circuit for also controlling the brakes.

33. In an electric brake system, in combination, electro-responsive means operative to control the brakes, a normally open circuit whereby operation of said electro-responsive means is effected, another electro-responsive means also operative to control the brakes, and a second circuit inductively coupled to said normally open circuit and adapted to be normally maintained closed through a portion of said normally open circuit whereby operation of said second electro-responsive means is effected.

34. In an electric brake system, in combination, a normally deenergized circuit, means operable upon energization of the said circuit for effecting an application of the brakes, a normally energized circuit including a portion of said first circuit, a second means operable on said normally energized circuit and adapted to effect an application of the brakes upon deenergization of said normally energized circuit, and means for preventing the operation of said second means to effect an application of the brakes unless the deenergization of said second circuit continues for more than a predetermined time.

RAYMOND E. MILLER.